United States Patent [19]
Heaton

[11] Patent Number: 5,922,052
[45] Date of Patent: Jul. 13, 1999

[54] FAST ETHERNET COMBINATION CHAINING OF AUTO-NEGOTIATIONS FOR MULTIPLE PHYSICAL LAYER CAPABILITY

[75] Inventor: Robert J. Heaton, Laguna Niguel, Calif.

[73] Assignee: Conexant Systems, Inc., Newport Beach, Calif.

[21] Appl. No.: 08/912,547

[22] Filed: Aug. 18, 1997

[51] Int. Cl.$^6$ ..................................................... G06F 13/00
[52] U.S. Cl. ............................................................ 709/223
[58] Field of Search .............................. 395/500, 200.53; 370/469

[56] References Cited

U.S. PATENT DOCUMENTS

| | | | |
|---|---|---|---|
| 5,610,903 | 3/1997 | Crayford | 370/213 |
| 5,737,108 | 4/1998 | Bunch et al. | 359/152 |
| 5,809,249 | 9/1998 | Julyan | 395/200.53 |

*Primary Examiner*—Kevin J. Teska
*Assistant Examiner*—Ayni Mohamed
*Attorney, Agent, or Firm*—Philip K. Yu

[57] ABSTRACT

A circuit and method for Ethernet combination chaining of auto-negotiation sessions for multiple physical layer capability. The present invention provides control circuitry for arbitrating between different physical layer circuit types that heretofore were allowed autonomous auto-negotiation processes because only one type of physical layer circuitry was applied at each end of a communication line. The present invention operates effectively within a hub of a local area network (LAN) communication system where multiple communication standards can be employed within circuitry that communicate at different ends of a communication line, e.g., twisted pair wire. In the environment of the invention, different types of physical layer circuits are integrated within communication devices. The invention provides a mechanism whereby, at each end of the communication line, a first physical layer circuit (e.g., the master) of a first type is allowed to auto-negotiate under the IEEE 802.3 standard with the other end of the communication line. On failure, the invention asserts signals causing a second physical layer circuit of a second type to auto-negotiate with the other end of the communication line. On failure again, if there are more than two physical layer circuit types, signals are asserted causing a third physical layer circuit of a third type to auto-negotiate, and so forth. If the last physical layer circuit's auto-negotiation fails, signals are asserted to return control to the master physical layer circuit which attempts auto-negotiation again, etc. This process continues until an auto-negotiation session is successful.

20 Claims, 7 Drawing Sheets

FAST ETHERNET COMBINATION CHAINING OF AUTO-NEGOTIATIONS FOR MULTIPLE PHYSICAL LAYER CAPABILITY

BACKGROUND OF THE INVENTION

1. Field of the Invention

The present invention relates to the field of local area networks (LANs) using the Ethernet communication protocol (e.g., the IEEE 802.3 Standard). Specifically, the present invention relates to an arbitration mechanism and process for multiple circuits having auto-negotiation sessions.

2. Related Art

Communication networks for computer systems are an extremely popular form of providing network computing today. FIG. 1A illustrates a high level block diagram of the communication levels within a typical communication network system 5System 5 has a first communication level 6 including communication adapters ("cards") that are inserted into computer systems to provide them with networking capability. The computer systems interface with users 4. The second communication level 7 is the workgroup level and includes hubs (e.g., repeater hubs, switching hubs, etc.). The hubs provide communication pathways between computer systems of the same or multiple local area networks (LANs). Computer systems coupled to a common hub share the same collision domain. A collision domain is a group of computer systems logically connected to share the same physical bandwidth (e.g. 10 Megabits/sec or 100 Megabitstsec) of a communication pathway. In the field of twisted pair cable repeater hubs, a collision domain is managed by a repeater interface controller (RIC). The third level 8 is often called the backbone or backplane level and can include segment switches. Among other functions, the components of level 8 provide communication pathways between hubs and between different collision domains.

FIG. 1B illustrates an exemplary prior art communication configuration including a hub 10 (or switch) and a computer system 30. The computer system typically contains one adapter card 35 which contains physical layer communication circuitry for establishing and maintaining communication over a communication line 20 (e.g., twisted pair wires). In the configuration 12 of FIG. 1B, the other end of the communication line 20 is coupled to port circuitry 15 of the unmanaged hub 10. The port circuitry 15 also contains physical layer communication circuitry for establishing and maintaining communication over communication line 20. The port circuitry 15 and the adapter card 35 can each contain physical layer circuitry that support multiple communication rate capabilities. For instance, port circuitry 15 and the adapter card 35 each can contain circuitry for communicating at 10 Base T (10 Megabits per second) capability and also 100 Base TX (100 Megabits per second) capability. Also, half or full duplex communication is typically supported. Alternatively, port circuitry 15 and the adapter card 35 each can contain circuitry for communicating at 10 Base T capability and also 100 Base T2 capability; again, half or full duplex is also supported.

With respect to the examples above, an auto-negotiation session is performed in accordance with the well known IEEE 802.3 standard in which the port circuitry 15 and the adapter card 35 engage in communication negotiation ("negotiation") to select between 10 Base T and 100 Base TX (half or full duplex) in one example, or between 10 Base T and 100 Base T2 (half or full duplex) in another example. The auto-negotiation session is generally performed such that the best obtainable communication speed is selected that can be supported by both ends of the communication line 20. As is well known within the IEEE 802.3 auto-negotiation processes, the physical layer communication circuits located on either end of the communication line 20 broadcast special data packets ("link packets") specifically designed to contain an identification of the communication capabilities of the data packet originator.

Auto-negotiation problems arise, however, when two or more physical layer capabilities are combined in a single circuit device, e.g., either combined in the adapter card 35 and/or combined in the port circuitry 15. For instance, problems arise when 100 Base TX physical layer circuits and also 100 Base T2 physical layer circuits are combined in the adapter card 35 and/or combined in the port circuitry 15 This type of physical layer combination is implemented ostensibly to provide robust physical layer capabilities for the devices in a network system. In these cases having combined physical layer capability, separate auto-negotiation circuits are implemented in each device. Problem occur because each physical layer circuit attempts to perform auto-negotiation (e.g., as between 10M and 100M communication and as between full and half duplex) on its own, e.g., autonomously, irrespective of the other circuit to which it is combined. When two or more physical layer communication circuits (that are combined) attempt to perform auto-negotiation simultaneously on the same communication line 20, the auto-negotiation sessions fail for both devices thereby impeding communication over line 20.

For instance, in an adapter having both 100 Base TX and 100 Base T2 physical layers in combination over a single communication line 20a first auto-negotiation session performed over line 20 as between 100 Base TX and 10 Base T will interfere with a second auto-negotiation session performed over line 20 as between 100 Base T2 and 10 Base T; the 100 Base TX and the 100 Base T2 physical layer circuits each having a respective 10 Base T capability and supporting full and half duplex. In effect, the IEEE 802.3 standard state machines were not designed to take into account the possibility of having multiple physical layer communication circuit capabilities combined on the same communication device and sharing the same end of a communication line 20.

Accordingly, what is needed is a circuit and method for allowing auto-negotiation processes to occur within devices that have combined physical layer capabilities that also share a same end of a communication line. What is needed further is a circuit and method for allowing auto-negotiation processes to occur within devices that have combined 100 Base T2 and 100 Base TX physical layer capabilities and that also share a same end of a communication line. What is needed yet further is a circuit and method for allowing auto-negotiation processes to occur within devices that have a 1000 Base T physical layer circuit combined with either 100 Base T2 physical layer capability or 100 Base TX physical layer capability and that also share a same end of a communication line. The present invention provides such advantageous functionality. These and other advantages of the present invention not specifically mentioned above will become clear within discussions of the present invention presented herein.

SUMMARY OF THE INVENTION

A circuit and method are described herein for Ethernet combination chaining of auto-negotiation sessions for multiple physical layer capabilities. The present invention provides control circuitry for arbitrating between different physical layer circuit types that heretofore were allowed autonomous auto-negotiation processes because only one type of physical layer circuitry was applied at each end of a communication line. The present invention operates effectively within a managed or an unmanaged hub of a local area network (LAN) communication system where multiple communication standards can be employed within circuitry that communicates at different ends of a communication line, e.g., twisted pair wire. In the environment of the invention, different types of physical layer circuits are integrated within communication devices. As such, the invention provides a mechanism whereby, at each end of the communication line, a first physical layer circuit (e.g., the master) of a first type is allowed to auto-negotiate under the IEEE 802.3 standard with the other end of the communication line. On failure, the invention asserts signals causing a second physical layer circuit of a second type, heretofore dormant, to auto-negotiate under the IEEE 802.3 standard with the other end of the communication line. On failure again, if there are more than two physical layer circuit types, signals are asserted causing a third physical layer circuit of a third type, heretofore dormant, to auto-negotiate under the IEEE 802.3 standard, and so forth. If the last physical layer circuit's auto-negotiation fails, signals are asserted to return control to the master physical layer circuit which attempts auto-negotiation again, etc. This process continues until an auto-negotiation session is successful at which time normal communication commences with the selected technology, While one circuit is in auto-negotiation, the other circuits in the combination are always dormant.

Specifically, embodiments of the present invention include a communication circuit comprising: (a) a master physical layer circuit coupled to communicate over a communication line at a first communication rate and a second communication rate, the master physical layer circuit comprising; a first auto-negotiation controller coupled to a first auto-in pin and coupled to a first auto-out pin; and a first auto-negotiation circuit for performing auto-negotiation over the communication line, the first auto-negotiation controller for allowing the first auto-negotiation circuit to auto-negotiate in response to a pulse over the first auto-in pin and in response to a reset signal; (b) a slave physical layer circuit coupled to communicate over the communication line at the first communication rate and the second communication rate, the slave physical layer circuit comprising: a second auto-negotiation controller coupled to a second auto-in pin and coupled to a second auto-out pin; and a second auto-negotiation circuit for performing auto-negotiation over the communication line, the second auto-negotiation controller for allowing the second auto-negotiation circuit to auto-negotiate in response to a pulse over the second auto-in pin; and (c) wherein the first auto-out pin is coupled to the second auto-in pin and the second auto-out pin is coupled to the first auto-in pin.

Embodiments of the present invention include the above and wherein the first auto-negotiation controller is for generating the pulse over the second auto-in pin upon an auto-negotiation failure of the first auto-negotiation circuit and the second auto-negotiation controller is for generating the pulse over the first auto-in pin upon an auto-negotiation failure of the second auto-negotiation circuit.

DETAILED DESCRIPTION OF THE INVENTION

In the following detailed description of the present invention, a circuit and method for Ethernet combination chaining of auto-negotiation sessions for multiple physical layer capability, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
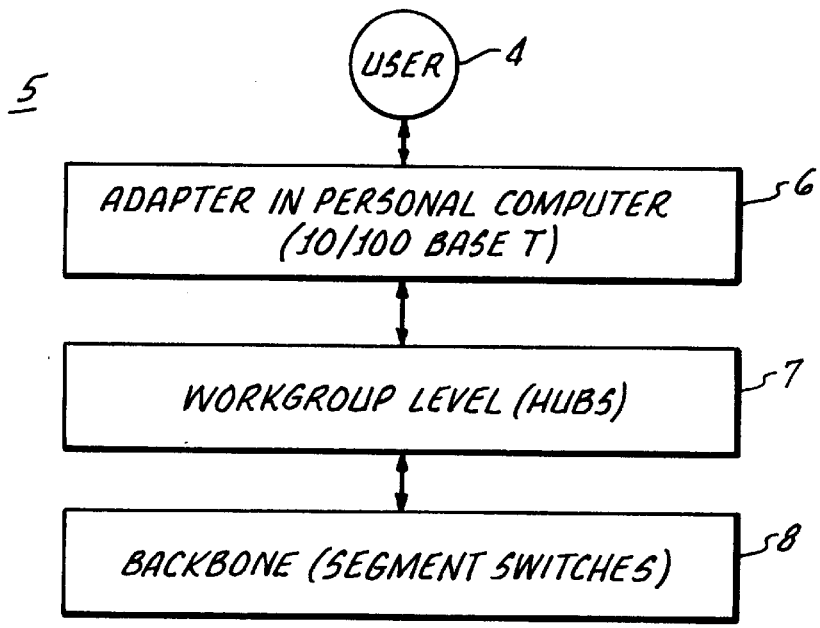
FIG. 1A is a prior art diagram of three levels of an Ethernet communication network including one level at the adapter of a computer system, a second workgroup level including repeater hubs and a third backbone level including segment switches.
Figure 1B:
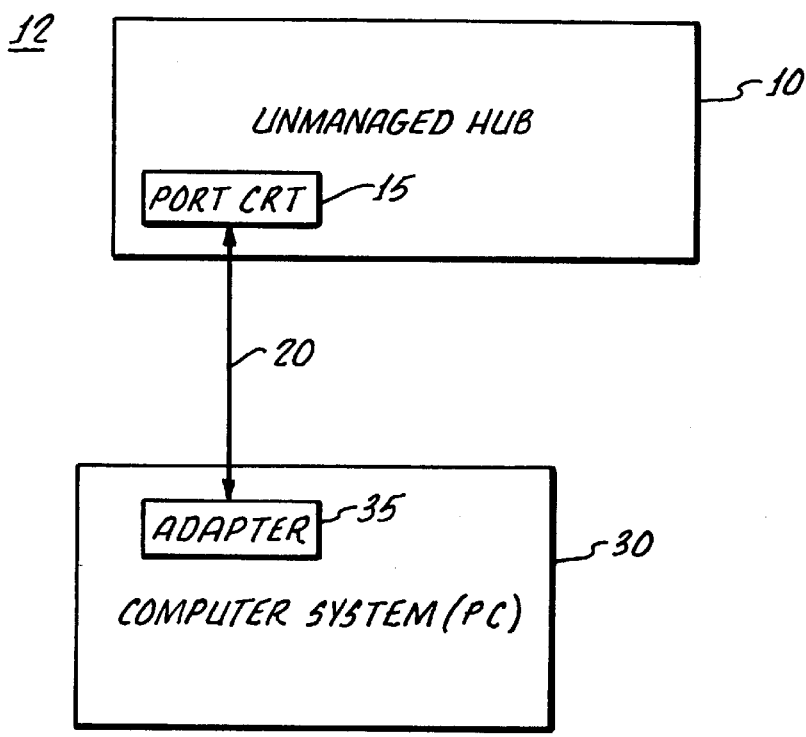
FIG. 1B illustrates communication circuitry positioned at each end of a communication line in accordance with the prior art.
Figure 2:
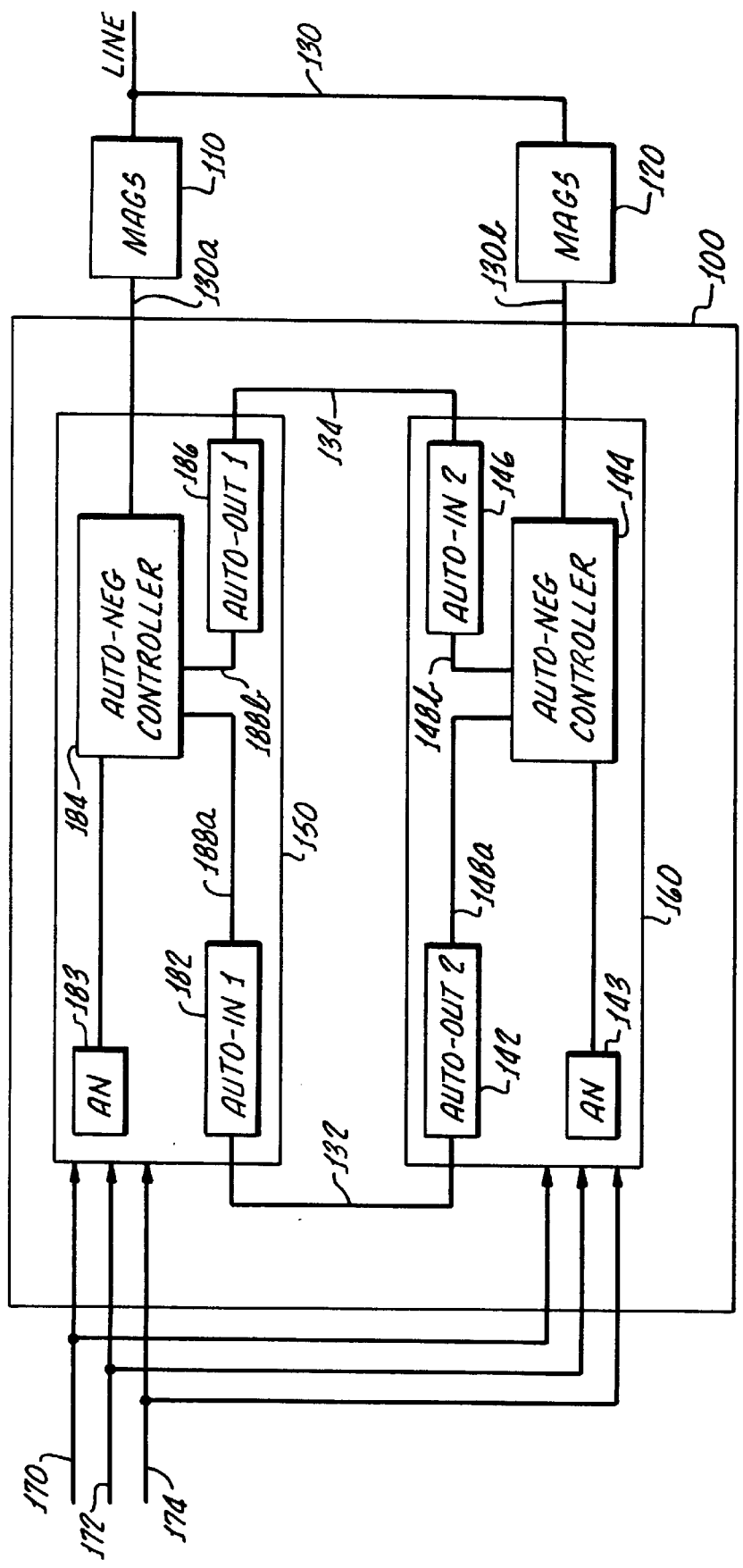
FIG. 2 illustrates communication circuitry and arbitration control circuitry in accordance with one embodiment of the present invention

FIG. 2 illustrates a communication circuit 100 embodying the present invention. Circuit 100 can reside within an adapter card of a computer system (e.g., within a network interface circuit or "NIC") and/or can reside as part of the physical layer of the port circuitry of a managed or an unmanaged hub or a switch. Circuit 100 contains a first physical layer communication circuit 150 containing a 10 megabits per second physical layer capability (e.g., 10 Base T) integrated with a 100 megabits per second physical layer capability (e.g., 100 Base TX). Typically, physical layer circuit 150 is an integrated circuit device or "chip." Circuit 100 also contains a second physical layer communication circuit 160 containing a 10 mega bits per second physical layer capability (e,g., 10 Base T) integrated with another 100 mega bits per second physical layer capability (e.g., 100 Base T2). Typically, physical layer circuit 160 is an integrated circuit device or "chip." It is appreciated that the 100 megabits per second physical layer capability of circuit 150 or circuit 160 can also be of the 100 Base T4 standard. Alternatively, the 100 megabits per second physical layer capability of circuit 150 or circuit 160 can also be replaced with a 1000 megabits per second capability, e.g., 1000 Base T. Circuit 150 and circuit 160 also support full and half duplex communication and utilize well known circuitry to implement these communication techniques.

Communication circuit 100 advantageously combines several physical layer communication capabilities together to provide a more robust design which allows circuit 100 to support communication with a wider variety of equipment over communication line 130. However, in the past, communication circuits of different 100 megabit physical layer capability were not typically implemented in a single communication circuit sharing the same communication line 130, as done in circuit 100 Therefore, the present invention addresses the problem of arbitrating between the otherwise autonomous auto-negotiation circuits included within circuit 100 (e.g., located within each physical layer circuit, as described in more detail below).

Each of the physical layer circuits 150 and 160 of FIG. 2 contains well known auto-negotiation features and circuits of the IEEE 802.3 standard, e.g., circuit 183 and circuit 143. According to this standard, the auto-negotiation circuits enter into auto-negotiation processes that negotiate for the highest bit rate, as between 10 megabits and 100 megabits per second and as between full and half duplex, that is supported by the communication circuitry situated at the far end of a communication line (e.g., line 130). The present invention incorporates auto-negotiation control circuitry 184 within circuit 150 and auto-negotiation control circuitry 144 within circuit 160 to arbitrate as between the IEEE 802.3 auto-negotiation processes of circuits 150 and 160 so that they do not conflict. Using the auto-negotiation control circuits 184 and 144the present invention effectively prevents the autonomous auto-negotiation processes of circuits 150 and 160 from interfering with each other which would prevent (absent the present invention) any auto-negotiation from occurring at all.

In FIG. 2, physical layer circuit 150 is coupled to receive and transmit data over line 130a to a line transformer circuit (e.g., line driver) 110 also referred to as magnetic circuitry or "MAGS." The MAGS circuit 110 is coupled to receive signals from and drive signals over communication line 130. Similarly, physical layer circuit 160 is coupled to receive and transmit data over line 130b to a line transformer circuit (e.g., line driver)120 also referred to as magnetic circuitry or "MAGS." The MAGS circuit 120 is coupled to receive signals from and drive signals over communication line 130. In this configuration, circuit 150 and circuit 160 are both able to use communication line 130It is appreciated that circuit 100 supports a wider variety of communication equipment by providing multiple physical layer circuits 150 and 160 coupled to a common communication line 130.

The physical layer circuits 150 and 160 of FIG. 2 also receive a set of external input signals over lines 170, 172 and 174. Bus 170 is an external interface, called a Media Independent Interface or "MII," which couples to a higher level of communication above the physical layer. The MII interface 170 receives information decoded by the physical layer circuits 150 and 160 when circuit 100 is receiving information. Also, MII interface 170 presents information to circuit 100 for encoding by the physical layer circuits 150 and 160 when circuit 100 is transmitting information. Often, the MII interface 170 is coupled to a media access controller or "MAC," not shown. An external reset signal is applied over line 172 to both physical layer communication circuits 150 and 160. Lastly, control information is supplied to physical layer communication circuits 150 and 160 over control bus 174. It is appreciated that in one embodiment, bus 174 is a three bit bus and is controlled by the contents of an external control register (not shown). However, within the scope of the present invention the bus 174 size can vary.

The auto-negotiation control circuits 184 and 144 communicate with each other via a first control line 134 and a second control line 132 that form a serial control chain. Physical layer circuit 150 receives control line 132 and physical layer circuit 160 receives control line 134. Control line 134 is driven by an auto-outi line driver 186 which receives a signal from line 188b originating from auto-negotiation circuit 184. Control line 134 is received by an auto-in2 receiver circuit 146 which is coupled to auto-negotiation circuit 144 via line 148b. Control line 132 is driven by an auto-out2 line driver 182 which receives a signal from line 148a originating from auto-negotiation circuit 144. Control line 132 is received by an auto-in1 receiver circuit 182 which is coupled to auto-negotiation circuit 184 via line 188a. The auto-out pin is set high for a few clock cycles to signal the next physical layer circuit in the control chain to take control of auto-negotiation in accordance with the present invention. The auto-out pin is chained to the auto-in pin of the upstream physical layer circuit in the loop or, if it is the end of the control chain, then chained back to the first auto-in as shown in FIG. 2.

In FIG. 2, the auto-negotiation controller 184 of physical layer circuit 150 enables the IEEE 802.3 auto negotiation circuit 183 to negotiate for speed and duplex type over line 130 when a pulse is received over line 132 or upon a reset signal over line 172 if physical layer circuit 150 is the master. Otherwise, controller 184 keeps circuit 150 dormant. Likewise, the auto-negotiation controller 144 of physical layer circuit 160 enables the IEEE 802.3 auto negotiation circuit 143 to negotiate for speed and duplex type over line 130 when a pulse is received over line 134 or upon a reset signal over line 172 if physical layer circuit 160 is the master. Otherwise, controller 144 keeps circuit 160 dormant. As discussed below with respect to Table I and Table II, the activity of the physical layer circuits 150 and 160 during auto-negotiation can be altered according to the control signals of bus 174.

It is appreciated that when the control line received by a physical layer circuit is pulsed high, this allows the auto-negotiation circuitry within that physical layer circuit to have access to communication line 130 and auto-negotiate with the communication circuitry located at the far end of the communication line 130. Generally, when the control line received by a physical layer circuit is low, the auto-negotiation circuits within that physical layer circuit are denied access to communication line 130 and can optionally be powered down completely.

In operation, one particular physical layer circuit within circuit 100 of FIG. 2 is selected to be the master and the other physical layer circuits (in this case there is only one other) is the slave. As an example, the master physical layer circuit can be assigned to physical layer circuit 150 (e.g., 100 Base TX), but could be any of the physical layer circuits within circuit 100. On reset, the master physical layer circuit 150 according to the present invention is allowed to auto-negotiate first over line 130 with the communication circuitry (if present) located in the equipment or system situated at the far end of communication line 130 (the "far communication circuitry"). During the master's auto-negotiation period, the second physical layer circuit 160 is dormant. The second physical layer circuit 160 receives a pulse over line 134 if and when the master's auto-negotiation process failed. This pulse initiates the auto-negotiation process for the second physical layer circuit 160. Likewise, the master physical layer circuit 150 receives a pulse over line 132 if and when the auto-negotiation process of the second physical circuit 160 failed.

Figure 4:
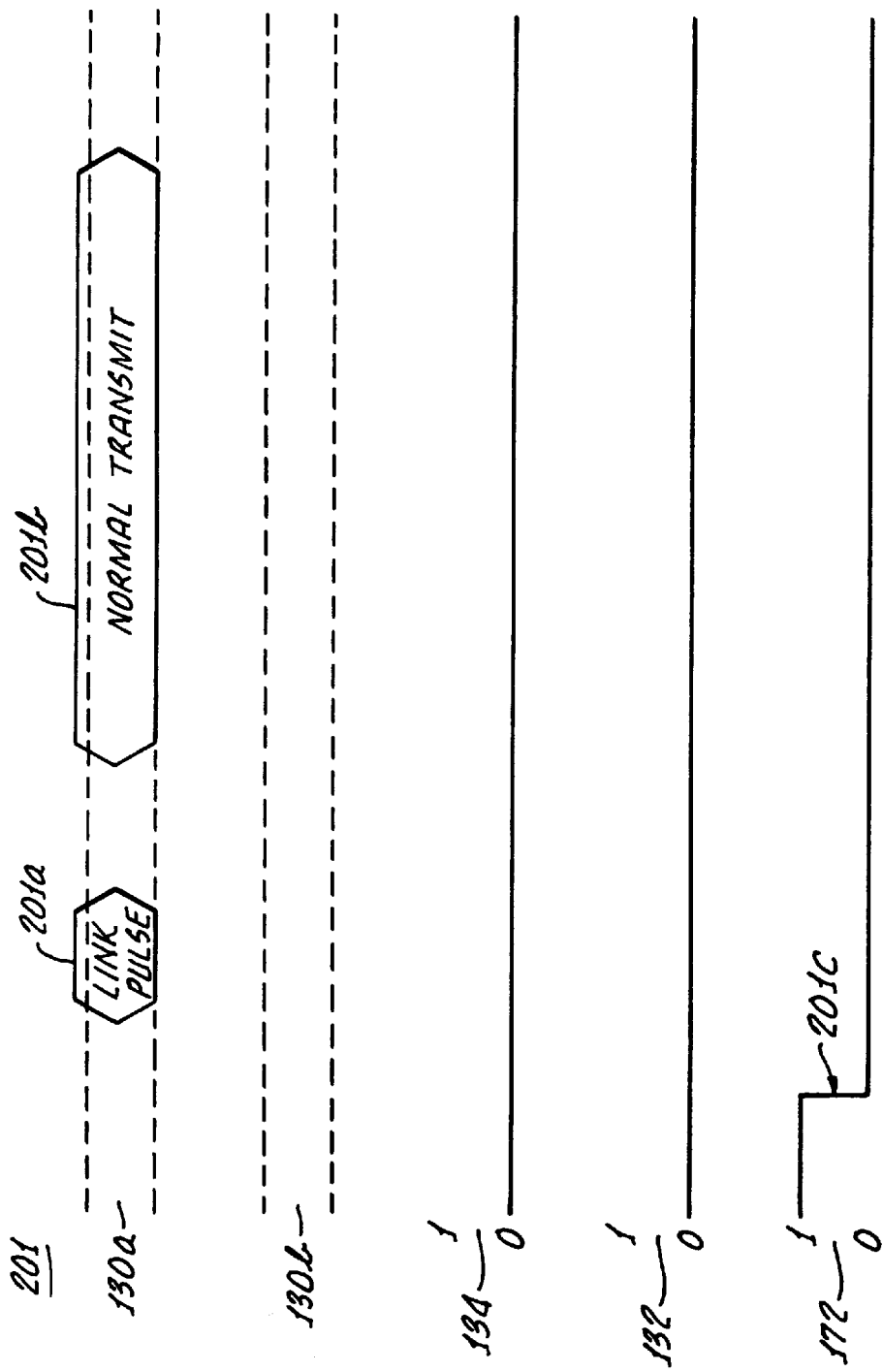
FIG. 4 illustrates a timing diagram of signals generated in accordance with the present invention when the master physical layer communication circuitry is successful in its auto-negotiation processes.

FIG. 4 illustrates a timing diagram 201 of the operation of the circuits of FIG. 2 assuming physical layer circuit 150 is the master. In the example case of FIG. 4, physical layer circuit 150 is successful in its auto-negotiation processes. At the start of the diagram 201, control lines 134 and 132 are low and the reset signal (asserted high) over line 172 goes low at 201c. This causes the auto-negotiation circuit 184 of physical layer circuit 150 to enter the IEEE 802.3 auto-negotiation process whereby special auto-negotiation link packets 201a are broadcast over line 130 (and 130a) and also received from the far circuitry over line 130. It is appreciated that the master physical layer circuit 150 enters auto-negotiation after reset regardless of the state of control line 132. These link packets from an originator at one end of communication line 130 inform the circuitry coupled to the other end of communication line 130 as to the capabilities of the originator pursuant to the IEEE 802.3 standard. According to the example of FIG. 4, the link packets 201a were successful in the auto-negotiation process of circuit 150Therefore, normal communication transmissions 201b occur between the physical layer circuit 150 and the far communication circuitry. In this case, physical layer circuit 160 remains dormant until another reset condition or an unrecoverable error occurs. As shown in the diagram 201, no active signals are seen over line 130b and line 134 and 132 remain low throughout.

Figure 5:
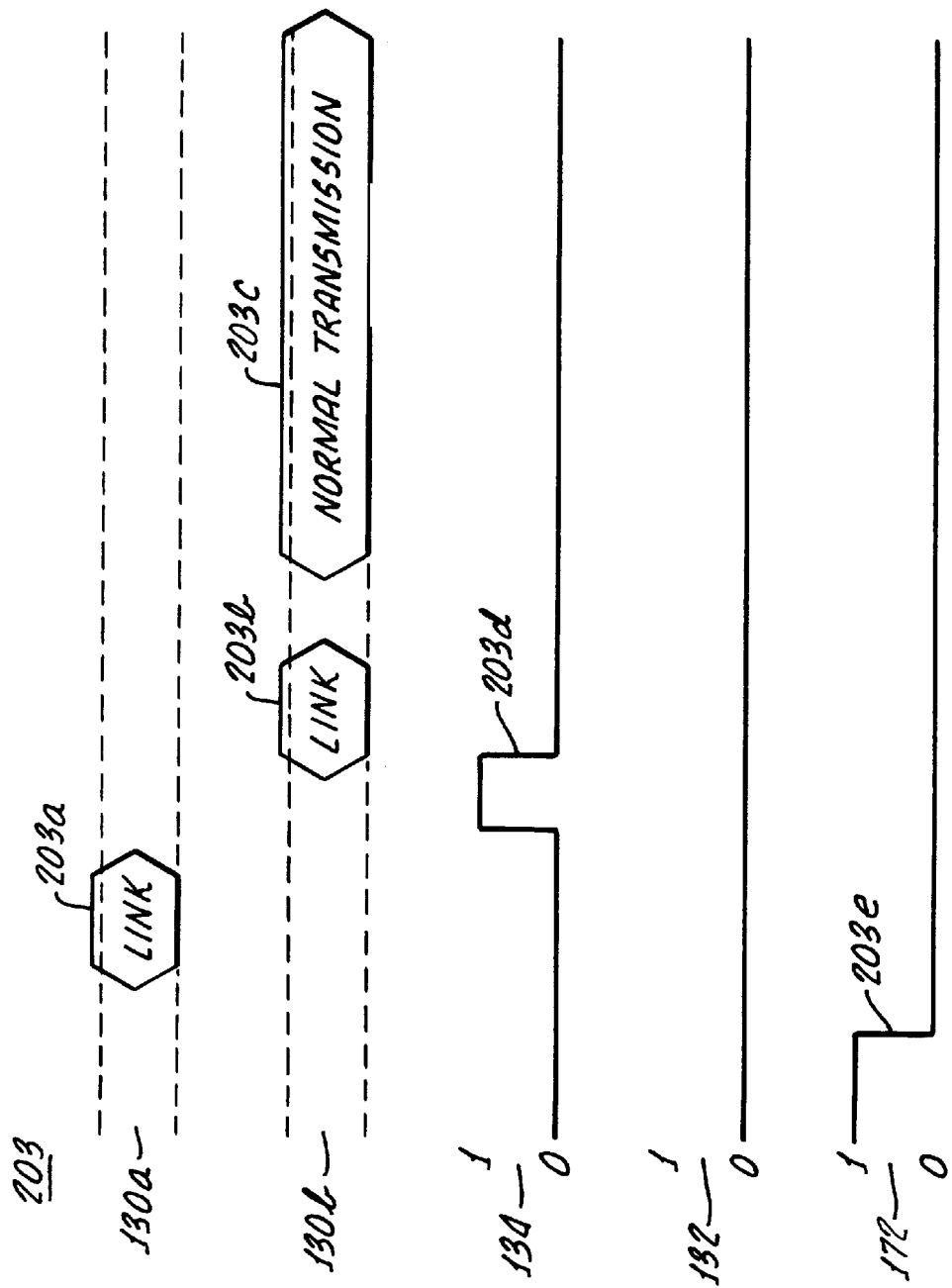
FIG. 5 illustrates a timing diagram of signals generated in accordance with the present invention when the master physical layer communication circuitry is not successful in its auto-negotiation processes but the second physical layer communication circuitry is successful in its auto-negotiation processes.

FIG. 5 illustrates a timing diagram 203 of the operation of the circuits of FIG. 2 assuming physical layer circuit 150 is the master. In the example case of FIG. 5, physical layer circuit 150 is not successful in its auto-negotiation processes, but physical layer 160 Is successful. At the start of the diagram 203, control lines 134 and 132 are low and the reset signal (asserted high) over line 172 goes low at 203e. This causes the auto-negotiation circuit 184 of physical layer circuit 150 to enter the IEEE 802.3 auto-negotiation process whereby special auto-negotiation link packets 203a are broadcast over line 130 and also received from the far circuitry over line 130. However, in this case, physical layer circuit 150 either negotiated for only 10 megabits per second communication (e.g., 10 Base T) or did not match the far communication circuitry at all. This condition can be determined by an inspection of a specialized register maintained within the IEEE 802.3 auto-negotiation circuit 183 of FIG. 2 that indicates if an auto-negotiation process resulted in a match or a failure.

Upon failure of circuit 183 to negotiate, the auto-negotiation controller 184 places circuit 150 into a dormant state and generates a pulse over line 134 shown as pulse 203d. This pulse 203d causes the auto-negotiation controller 144 of physical layer circuit 160 to power up its auto-negotiation circuit 143 which subsequently negotiates over line 130 (via line 130b) as shown by the link packets 203b generated over line 130b. According to the example of FIG. 5, the link packets 203b were successful in the auto-negotiation process of circuit 160. Therefore, normal communication transmissions 203c occur between the physical layer circuit 160 and the far communication circuitry. In this case, physical layer circuit 150 remains dormant until another reset condition or an unrecoverable error occurs. As shown in the diagram 203line 132 remains low throughout.

Figure 6:
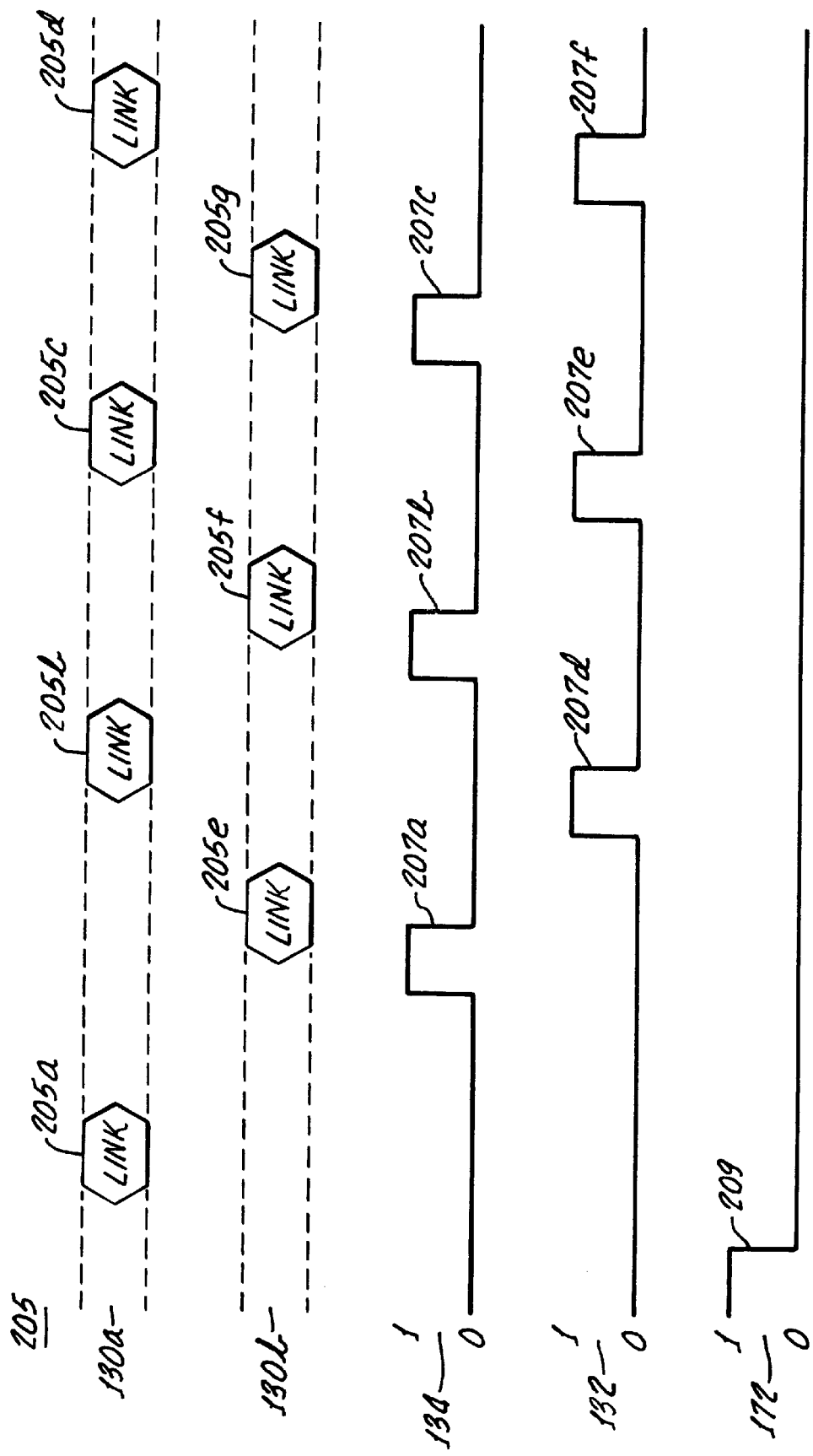
FIG. 6 illustrates a timing diagram of signals generated in accordance with the present invention when the master physical layer communication circuitry is not successful in its auto-negotiation processes and the second physical layer communication circuitry is not successful in its auto-negotiation processes.

FIG. 6 illustrates a timing diagram 205 of the operation of the circuits of FIG. 2 assuming physical layer circuit 150 is the master, In the example case of FIG. 6, physical layer circuit 150 is not successful in its auto-negotiation processes and physical layer 160 is not successful. This state can exist if no far communication circuitry is present on communication line 130. At the start of the diagram 205 control lines 134 and 132 are low and the reset signal (asserted high) over line 172 goes low at 209. This causes the auto-negotiation circuit 184 of physical layer circuit 150 to enter the IEEE 802.3 auto-negotiation process whereby special auto-negotiation link packets 205a are broadcast over line 130 and also received from the far circuitry (if present) over line 130. However, in this case, physical layer circuit 150 either negotiated for only 10 megabits per second communication (e.g., 10 Base T) or did not match the far communication circuitry at all or no far communication circuitry was present. This condition can be determined by an inspection of the specialized register maintained within the IEEE 802.3 auto-negotiation circuit 183 of FIG. 2.

Upon failure of circuit 183 to negotiate, the auto-negotiation controller 184 places circuit 150 into a dormant state and generates a pulse over line 134 shown as pulse 207a of FIG. 6. This pulse 207a causes the auto-negotiation controller 144 of physical layer circuit 160 to power up its auto-negotiation circuit 143 which subsequently negotiates over line 130 as shown by the link packets 205e generated over line 130b. However, in this case, physical layer circuit 160 either negotiated for only 10 megabits per second communication (e.g., 10 Base T) or did not match the far communication circuitry at all or no far communication circuitry was present. This condition can be determined by an inspection of a specialized register maintained within the IEEE 802.3 auto-negotiation circuit 143 of FIG. 2 that indicates if an auto-negotiation process resulted in a match or a failure. Therefore, auto-negotiation controller 144 then powers down its auto-negotiation processes and generates a pulse 207d over line 132 causing circuit 150 to power up and negotiate. Subsequently, link packets 205b are generated over line 130a.

Again, upon failure of circuit 150 to negotiate, pulse 207b of FIG. 6 is issued by auto-negotiation circuit 184 causing circuit 160 to negotiate as shown by link packets 205f. Again, upon failure of circuit 160 to negotiate, pulse 207e is issued by auto-negotiation circuit 144 causing circuit 150 to negotiate as shown by link packets 205c. As shown in FIG. 6, this process continues indefinitely until the far communication circuitry auto-negotiates or until circuit 100 powers-down. It is appreciated that in accordance with the present invention, circuit 100 performs the timing shown in FIG. 6 when no far communication circuitry is present. This is advantageous because when far communication circuitry is eventually inserted, auto-negotiation proceeds at the auto-negotiation session.

MAJOR STATES

The physical layer circuits 150 and 160 (FIG. 2) in accordance with the present invention can be in one of three possible major states of operation: (1) Running; (2) Dormant; or (3) Auto-Negotiation. The first state is the Running state and in this state, a physical layer circuit is in its normal power up mode and communicating over line 130 after a successful auto-negotiation session. In FIG. 4, circuit 150 is in the Running state at 201b. In FIG. 5, circuit 160 is in the Running state at 203c.

The second state is the Dormant state. A physical layer circuit can be placed into the dormant state when reset 172 is asserted or if its auto-negotiation process failed and another physical layer circuit has control of line 130. While dormant, its transmit output pins (e.g., TX+and TX−) are in their off state (e.g., high impedance for 100 Base TX current drivers and low impedance for 100 Base T2 voltage drivers). Also, its receive input pins (e.g., RX+and RX−) are placed into high impedance as is the hybrid T2 input. The transmitter and receiver circuits of the physical layer circuit are powered down. In this Dormant state, the physical layer circuit responds to a reset signal and also an auto-in transition only. The response to the auto-in pin is to enter the auto-negotiation state. If the physical layer circuit is the master, then the response to the reset is to enter the Auto-Negotiation state. If the physical layer circuit is not the master, then the response to the reset is to remain in the Dormant state until auto-in is pulsed. Internal register values are retained in the Dormant state.

The last state is the Auto-Negotiation state. In this state, only enough of the transmit and receive circuitry are powered up within the physical layer circuit to permit auto-negotiation functionality. Serial Management functions are also powered up. In this mode, the normal IEEE 802.3 auto-negotiation processes take place over line 130.

SPECIAL PROGRAMMED STATES

In one embodiment, physical layer circuit 150 of FIG. 2 is a 100 Base TX and physical layer circuit 160 is a 100 Base T2. Table I below illustrates various modes of behavior for auto-negotiation that physical layer 150 can be programmed to performed based on programming of the control bus 174.

TABLE I

| Control Bits 174 | Usage | Auto Negotiation | Mode Description |
|---|---|---|---|
| 000 | | NO | Isolate |
| 001 | | NO | Force Half Duplex 10 Base T |
| 010 | | NO | Force Half Duplex 100 Base TX |
| 011 | Single Phy TX Dumb Hub | NO | Force Full Duplex 100 Base TX (For Single Physical Layer Device "PHY" TX Repeater) |
| 100 | | YES | Offer 100 Base TX Half Duplex Only |
| 101 | | YES | Offer 100 Base TX Full Duplex Only |
| 110 | Dumb Hub Dual Phy Case | YES | Offer 100 Base TX Modes Only. If Link Partner Does Not Offer 100 Base TX Then Transfer Control Via Auto Out Line |
| 111 | NIC or Switch Single Phy Fully Auto-Negotiated System | YES | Offer Half or Full Duplex 10 Base T and 100 Base TX |

When used as a repeater, the control pins 174 are set to 011 in this embodiment. This causes the CRS to behave properly in full and half duplex modes. Table II below illustrates various modes of behavior for auto-negotiation that physical layer 160 can be programmed to performed based on programming of the control bus 174

TABLE II

| Control Bits 174 | Usage | Auto Negotiation | Mode Description |
|---|---|---|---|
| 000 | | NO | Isolate |
| 001 | | NO | Force Half Duplex 10 Base T |
| 010 | | NO | Force Half Duplex 100 Base T2 |
| 011 | Single Phy TX Dumb Hub | NO | Force Full Duplex 100 Base T2 (For Single Physical Layer Device "PHY" T2 Repeater) |

TABLE II-continued

| Control Bits 174 | Usage | Auto Negotiation | Mode Description |
|---|---|---|---|
| 100 | | YES | Offer 100 Base T2 Half Duplex Only |
| 101 | | YES | Offer 100 Base T2 Full Duplex Only |
| 110 | Dumb Hub Dual Phy Case | YES | Offer 100 Base T2 Modes Only. If Link Partner Does Not Offer 100 Base T2 Then Transfer Control Via Auto Out Line |
| 111 | NIC or Switch Single Phy Fully Auto-Negotiated System | YES | Offer Half or Full Duplex 10 Base T and 100 Base T2 |

MULTIPLE PHYSICAL LAYER CIRCUITS

Figure 3:
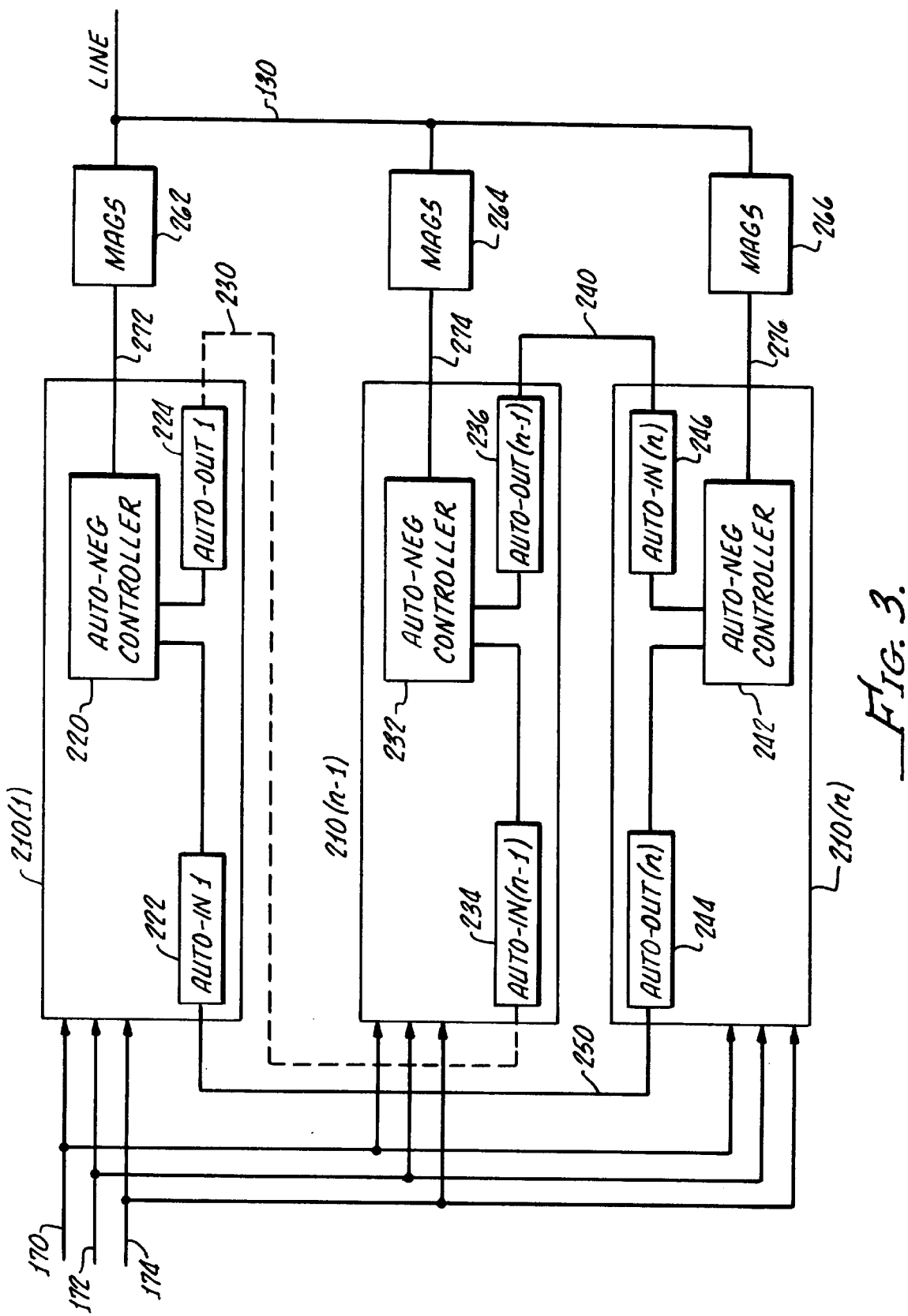
FIG. 3 illustrates communication circuitry and arbitration control circuitry in accordance with a second embodiment of the present invention

FIG. 3 illustrates an embodiment of the present invention having n physical layer circuits: 210 (1), . . . , 210(n–1), 210(n) coupled in a serial control chain via control lines 230, . . ., 240 and 250. Circuit 210(1) is the most downstream circuit in the chain while circuit 210(n) is the most upstream circuit in the chain. In this case, 100 Base TX, 100 Base T2 and also 1000 Base T can be supported. Each of the physical layer devices 210 (1), . . . , 210(n–1), 210(n) are coupled to communication line 130 via a MAGS circuit and each also contains a respective auto-negotiation controller circuit 220, 232, and 242, respectively. As discussed previously, the auto-out pin of a physical layer device (e.g., 230, . . . , 240 and 250) is chained to the auto-in pin of the upstream physical layer circuit in the loop or, if it is the end of the control chain, then chained back to the first auto-in 222 as shown in FIG. 3. The MII bus 170 as well as the reset line 172 as wells as the control bus 174 are coupled to each of the physical layer circuits 210 (1), . . . , 210(n–1), 210(n).

As discussed with respect to FIG. 2, upon failure of an auto-negotiation process of a downstream physical layer circuit (e.g., circuit 210(n–1) of FIG. 3), an upstream physical layer circuit (e.g., circuit 210(n) of FIG. 3) is next granted authorization to auto-negotiate in accordance with the present invention. Upon auto-negotiation failure of circuit 210(n), the first physical layer circuit 210(1) is then allowed to auto-negotiate over line 130.

FLOW DIAGRAM

Figure 7:
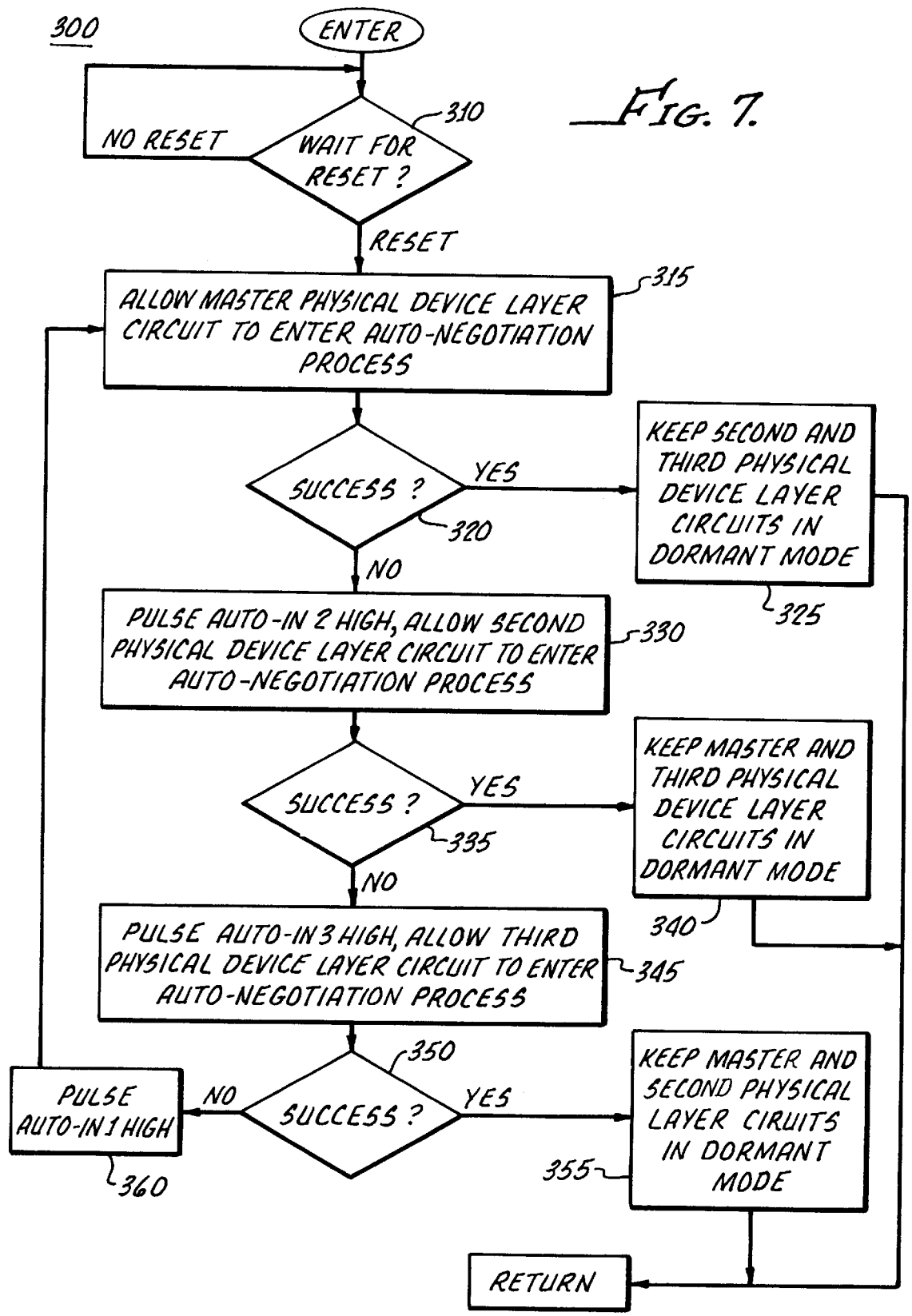
FIG. 7 is a flow chart of steps performed by the present invention for an exemplary embodiment having a master physical layer communication circuit type and two other slave physical layer communication circuit types.

FIG. 7 illustrates steps performed in accordance with the present invention for an exemplary circuit having three physical layer circuits: a first physical circuit serially chained with a first control line to a second physical layer circuit serially chained with a second control line to a third physical layer circuit which is serially chained with a third control line to the first physical layer circuit (FIG. 3 where n=3). The first physical layer circuit is the most downstream circuit and is also the master; the third physical layer circuit is the most upstream circuit It is appreciated that this flow diagram 300 can be extended to include a circuit having n physical layer circuits (FIG. 3) or abbreviated to fully described the circuit 100 of FIG. 2 having two physical layer circuits 150 and 160.

At step 310, the circuit of the present invention waits for a reset signal over line 172. While at step 310, the three physical layer devices are in the Dormant state. Upon the reset line 172 going low, step 315 is entered. At step 315, the present invention allows the master physical layer circuit to commence auto-negotiation over line 130; at this time the first physical layer circuit is in the Auto-Negotiation state. Negotiation is made as between 100 and 10 megabits per second and as between half and full duplex. At step 320, after a predetermined period of time, the present invention causes the auto-negotiation controller of the first physical device to check its internal registers and determine if the auto-negotiation process was successful. Typically, success is not registered if only 10 Base T is negotiated by the first physical layer circuit, If success is not reached at step 320, then step 330 is entered. If success is reached at step 320, then step 325 is entered. At step 325, the first physical layer circuit is placed into the Running mode and the second and third physical layer circuits remain in the Dormant state. Process 300 then returns.

At step 330, the auto-negotiation controller of the first physical layer circuit pulses its auto-out1 pin high which is the auto-in2 pin of the second physical layer circuit. At step 330, the first physical layer circuit enters the Dormant state and the second physical circuit enters the Auto-Negotiation State. Negotiation is made as between 100 and 10 megabits per second and as between half and full duplex. At step 335, after a predetermined amount of time, the present invention causes the auto-negotiation controller of the second physical device to check its internal registers and determine if its auto-negotiation process was successful. Typically, success is not registered if only 10 Base T is negotiated by the second physical layer circuit. If success is not reached at step 335, then step 345 is entered. If success is reached at step 335, then step 340 is entered. At step 340, the second physical layer circuit is placed into the Running mode and the first and third physical layer circuits remain in the Dormnant state. Process 300 then returns.

At step 345, the auto-negotiation controller of the second physical layer circuit pulses its auto-out2 pin high which is the auto-in3 pin of the third physical layer circuit. At step 345, the second physical layer circuit enters the Dormant state and the third physical circuit enters the Auto-Negotiation State. Negotiation is made as between 100 and 10 megabits per second and as between half and full duplex. At step 350, after a predetermined amount of time, the present invention causes the auto-negotiation controller of the third physical device to check its internal registers and determine if its auto-negotiation process was successful. Typically, success is not registered if only 10 Base T is negotiated by the third physical layer circuit, If success is not reached at step 350, then step 360 is entered. If success is reached at step 350, step 355 is entered. At step 355, the third physical layer circuit is placed into the Running mode and the first and second physical layer circuits remain in the Dormant state. Process 300 then returns.

At step 360, the autonegotiation controller of the third physical layer circuit pulses its auto-out3 pin high which is the auto-in1 pin of the first physical layer circuit. At step 360, the third physical layer circuit enters the Dormant state and step 315 is entered. At step 315, the first physical circuit enters the Auto-Negotiation State and process 300 continues as described above.

It is appreciated that the flow diagram of FIG. 7 can also be implemented in software under control of a computer system that uses the Serial Management interface to control the functionality of the physical layer circuits.

The preferred embodiment of the present invention, a circuit and method for Ethernet combination chaining of auto-negotiation sessions for multiple physical layer capability, are described. While the present invention has been described in particular embodiments, it should be appreciated that the present invention should not be construed as limited by such embodiments, but rather construed according to the below claims.

What is claimed is:
1. A communication circuit comprising:
(a) a first physical layer circuit coupled to communicate over a communication line at a first communication rate and a second communication rate, said first physical layer circuit comprising:
    a first auto-negotiation controller coupled to receive a signal over a first auto-in pin and coupled to generate a signal over a first auto-out pin; and
    a first auto-negotiation circuit for performing auto-negotiation over said communication line;
(b) a second physical layer circuit coupled to communicate over said communication line at said first communication rate and said second communication rate, said second physical layer circuit comprising:
    a second auto-negotiation controller coupled to receive a signal over a second auto-in pin and coupled to generate a signal over a second auto-out pin, wherein said second auto-out pin is coupled to said first auto-in pin and said first auto-out pin is coupled to said second auto-in pin; and
    a second auto-negotiation circuit for performing auto-negotiation over said communication line; and
(c) wherein said second auto-negotiation controller is for placing said second physical layer circuit into a dormant mode while said first auto-negotiation circuit auto-negotiates over said communication line and wherein further said first auto-negotiation controller is for placing said first physical layer circuit into a dormant mode while said second auto-negotiation circuit auto-negotiates over said communication line.

2. A communication circuit comprising:
(a) a first physical layer circuit coupled to communicate over a communication line at a first communication rate and a second communication rate, said first physical layer circuit comprising:
    a first auto-negotiation controller coupled to receive a signal over a first auto-in pin and coupled to generate a signal over a first auto-out pin; and
    a first auto-negotiation circuit for performing auto-negotiation over said communication line;
(b) a second physical layer circuit coupled to communicate over said communication line at said first communication rate and said second communication rate, said second physical layer circuit comprising:
    a second auto-negotiation controller coupled to receive a signal over a second auto-in pin and coupled to generate a signal over a second auto-out pin, wherein said second auto-out pin is coupled to said first auto-in pin and said first auto-out pin is coupled to said second auto-in pin; and
    a second auto-negotiation circuit for performing auto-negotiation over said communication line;
(c) wherein said second auto-negotiation controller is for placing said second Physical layer circuit into a dormant mode while said first auto-negotiation circuit auto-negotiates over said communication line and wherein said first auto-negotiation controller is for placing said first physical layer circuit into a dormant mode while said second auto-negotiation circuit auto-negotiates over said communication line; and
wherein said first auto-negotiation controller is for generating a pulse over said first auto-out pin upon a failure of said first auto-negotiation circuit to auto-negotiate over said communication line and wherein said second auto-negotiation circuit commences auto-negotiation in response to said pulse over said first auto-out pin.

3. A communication circuit as described in claim 2 wherein said second auto-negotiation controller is for generating a pulse over said second auto-out pin upon a failure of said second auto-negotiation circuit to auto-negotiate over said communication line and wherein said first auto-negotiation circuit commences auto-negotiation in response to said pulse over said second auto-out pin.

4. A communication circuit comprising:
(a) a first physical layer circuit coupled to communicate over a communication line at a first communication rate and a second communication rate, said first physical layer circuit comprising:
  a first auto-negotiation controller coupled to receive a signal over a first auto-in pin and coupled to generate a signal over a first auto-out sin; and
  a first auto-negotiation circuit for performing auto-negotiation over said communication line;
(b) a second physical layer circuit coupled to communicate over said communication line at said first communication rate and said second communication rate, said second physical layer circuit comprising:
  a second auto-negotiation controller coupled to receive a signal over a second auto-in pin and coupled to generate a signal over a second auto-out pin, wherein said second auto-out pin is coupled to said first auto-in pin and said first auto-out pin is coupled to said second auto-in pin; and
  a second auto-negotiation circuit for performing auto-negotiation over said communication line;
(c) wherein said second auto-negotiation controller is for placing said second physical layer circuit into a dormant mode while said first auto-negotiation circuit auto-negotiates over said communication line and wherein said first auto-negotiation controller is for placing said first physical layer circuit into a dormant mode while said second auto-negotiation circuit auto-negotiates over said communication line; and
said communication circuit further comprising a reset line coupled to said first physical layer circuit and further coupled to said second physical layer circuit, said reset line supplying a reset signal causing said first auto-negotiation circuit to first commence auto-negotiation over said communication line irrespective of the state of any signal over said first auto-in pin.

5. A communication circuit comprising:
(a) a first physical layer circuit coupled to communicate over a communication line at a first communication rate and a second communication rate, said first physical layer circuit comprising:
  a first auto-negotiation controller coupled to receive a signal over a first auto-in pin and coupled to generate a signal over a first auto-out pin; and
  a first auto-negotiation circuit for performing auto-negotiation over said communication line;
(b) a second physical layer circuit coupled to communicate over said communication line at said first communication rate and said second communication rate, said second physical layer circuit comprising:
  a second auto-negotiation controller coupled to receive a signal over a second auto-in pin and coupled to generate a signal over a second auto-out pin, wherein said second auto-out pin is coupled to said first auto-in pin and said first auto-out pin is coupled to said second auto-in pin; and
  a second auto-negotiation circuit for performing auto-negotiation over said communication line;
(c) wherein said second auto-negotiation controller is for placing said second physical layer circuit into a dormant mode while said first auto-negotiation circuit auto-negotiates over said communication line and wherein said first auto-negotiation controller is for placing said first physical layer circuit into a dormant mode while said second auto-negotiation circuit auto-negotiates over said communication line; and
wherein said first physical layer circuit conforms to the 100 Base TX communication standard and wherein said first communication rate is 100 megabits per second and wherein said second communication rate is 10 megabits per second and conforms to the 10 Base T communication standard.

6. A communication circuit as described in claim 5 wherein said second physical layer circuit conforms to the 100 Base T2 communication standard.

7. A communication circuit as described in claim 5 wherein said second physical layer circuit conforms to the 1000 Base T communication standard.

8. A communication circuit comprising:
(a) a master physical layer circuit coupled to communicate over a communication line at a first communication rate and a second communication rate, said master physical layer circuit comprising:
  a first auto-negotiation controller coupled to a first auto-in pin and to a first auto-out pin; and
  a first auto-negotiation circuit for performing auto-negotiation over said communication line, said first auto-negotiation controller for allowing said first auto-negotiation circuit to auto-negotiate in response to a pulse over said first auto-in pin and in response to a reset signal;
(b) a first slave physical layer circuit coupled to communicate over said communication line at said first communication rate and said second communication rate, said first slave physical layer circuit comprising:
  a second auto-negotiation controller coupled to a second auto-in pin and to a second auto-out pin; and
  a second auto-negotiation circuit for performing auto-negotiation over said communication line, said second auto-negotiation controller for allowing said second auto-negotiation circuit to auto-negotiate in response to a pulse over said second auto-in pin; and
(c) a second slave physical layer circuit coupled to communicate over said communication line at said first communication rate and said second communication rate, said second upstream slave physical layer circus comprising:
  a third auto-negotiation controller coupled to a third auto-in pin and coupled to a third auto-out pin; and
  a third auto-negotiation circuit for performing auto-negotiation over said communication line, said third auto-negotiation controller for allowing said third auto-negotiation circuit to auto-negotiate in response to a pulse over said third auto-in pin.

9. A communication circuit comprising:
(a) a master physical layer circuit coupled to communicate over a communication line at a first communication rate and a second communication rate, said master physical layer circuit comprising:
  a first auto-negotiation controller coupled to a first auto-in pin and to a first auto-out pin; and a first auto-negotiation circuit for performing auto-negotiation over said communication line, said first auto-negotiation controller for allowing said first auto-negotiation circuit to auto-negotiate in response to a pulse over said first auto-in pin and in response to a reset signal;

(b) a first slave physical layer circuit coupled to communicate over said communication line at said first communication rate and said second communication rate, said first slave physical layer circuit comprising:
  a second auto-negotiation controller coupled to a second auto-in pin and to a second auto-out pin; and
  a second auto-negotiation circuit for performing auto-negotiation over said communication line, said second auto-negotiation controller for allowing said second auto-negotiation circuit to auto-negotiate in response to a pulse over said second auto-in pin;

(c) a second slave physical layer circuit coupled to communicate over said communication line at said first communication rate and said second communication rate, said second slave physical layer circuit comprising:
  a third auto-negotiation controller coupled to a third auto-in pin and to a third auto-out pin; and
  a third auto-negotiation circuit for performing auto-negotiation over said communication line, said third auto-negotiation controller for allowing said third auto-negotiation circuit to auto-negotiate in response to a pulse over said third auto-in pin;

wherein said first auto-out pin is coupled to said second auto-in pin, said second auto-out pin is coupled to said third auto-in pin, and said third auto-out pin is coupled to said first auto-in pin.

10. A communication circuit as described in claim 9 wherein said first auto-negotiation controller is for generating said pulse over said second auto-in pin upon an auto-negotiation failure of said first auto-negotiation circuit, said second auto-negotiation controller is for generating said pulse over said third auto-in pin upon an auto-negotiation failure of said second auto-negotiation circuit and said third auto-negotiation controller is for generating a pulse over said first auto-in pin upon an auto-negotiation failure of said third auto-negotiation circuit.

11. A communication circuit as described in claim 10 further comprising a reset line coupled to said master physical layer circuit, said first slave physical layer circuit and said second slave physical layer circuit, said reset line for supplying said reset signal causing said first auto-negotiation circuit to first commence auto-negotiation over said communication line irrespective of the state of any signal over said first auto-in pin.

12. A communication circuit as described in claim 10 wherein said master physical layer circuit communicates in conformance with the 100 Base TX communication standard and wherein said first communication rate is 100 megabits per second and wherein said second communication rate is 10 megabits per second in conformance with the 10 Base T communication standard.

13. A communication circuit as described in claim 10 wherein said master physical layer circuit communicates in conformance with the 100 Base T2 communication standard and wherein said first communication rate is 100 megabits per second and wherein said second communication rate is 10 megabits per second in conformance with the 10 Base T communication standard.

14. A communication circuit as described in claim 10 wherein said master physical layer circuit communicates in conformance with the 1000 Base T communication standard.

15. A communication circuit comprising:

(a) a master physical layer circuit coupled to communicate over a communication line at a first communication rate and a second communication rate, said master physical layer circuit comprising:
  a first auto-negotiaton controller coupled to a first auto-in pin and coupled to a first auto-out pin; and
  a first auto-negotiation circuit for performing auto-negotiation over said communication line, said first auto-negotiation controller for allowing said first auto-negotiation circuit to auto-negotiate in response to a pulse over said first auto-in pin and in response to a reset signal;

(b) a slave physical layer circuit coupled to communicate over said communication line at said first communication rate and said second communication rate, said slave physical layer circuit comprising:
  a second auto-negotiation controller coupled to a second auto-in pin and coupled to a second auto-out pin; and
  a second auto-negotiation circuit for performing auto-negotiation over said communication line, said second auto-negotiation controller for allowing said second auto-negotiation circuit to auto-negotiate in response to a pulse over said second auto-in pin; and (c) wherein said first auto-out pin is coupled to said second auto-in pin and said second auto-out pin is coupled to said first auto-in pin.

16. A communication circuit comprising:

(a) a master physical layer circuit coupled to communicate over a communication line at a first communication rate and a second communication rate, said master physical layer circuit comprising:
  a first auto-negotiation controller coupled to a first auto-in pin and to a first auto-out pin; and
  a first auto-negotiation circuit for performing auto-negotiation over said communication line, said first auto-negotiation controller for allowing said first auto-negotiation circuit to auto-negotiate in response to a pulse over said first auto-in pin and in response to a reset signal;

(b) a slave physical layer circuit coupled to communicate over said communication line at said first communication rate and said second communication rate, said slave physical layer circuit comprising:
  a second auto-negotiation controller coupled to a second auto-in pin and to a second auto-out pin; and
  a second auto-negotiation circuit for performing auto-negotiation over said communication line, said second auto-negotiation controller for allowing said second auto-negotiation circuit to auto-negotiate in response to a pulse over said second auto-in pin;

(c) wherein said first auto-out pin is coupled to said second auto-in pin and said second auto-out pin is coupled to said first auto-in pin; and wherein said first auto-negotiation controller is for generating said pulse over said second auto-in pin upon an auto-negotiation failure of said first auto-negotiation circuit and said second auto-negotiation controller is for generating said pulse over said first auto-in pin upon an auto-negotiation failure of said second auto-negotiation circuit.

17. A communication circuit as described in claim 16 further comprising a reset line coupled to said master physical layer circuit and to said slave physical layer circuit, said reset line for supplying said reset signal causing said first auto-negotiation circuit to first commence auto-negotiation over said communication line irrespective of the state of any signal over said first auto-in pin.

18. A communication circuit as described in claim 16 wherein said master physical layer circuit communicates in conformance with the 100 Base TX communication standard and wherein said first communication rate is 100 megabits per second and wherein said second communication rate is 10 megabits per second and conforms with the 10 Base T communication standard and wherein said slave physical layer circuit communicates in conformance with the 100 Base T2 communication standard.

19. A communication circuit as described in claim 16 wherein said master physical layer circuit communicates in conformance with the 100 Base T2 communication standard and wherein said first communication rate is 100 megabits per second and wherein said second communication rate is 10 megabits per second and conforms with the 10 Base T communication standard and wherein said slave physical layer circuit communicates in conformance with the 100 Base TX communication standard.

20. A communication circuit as described in claim 17 wherein said master physical layer circuit communicates in conformance with the 1000 Base T communication standard and wherein said slave physical layer circuit communicates at 100 Megabits per second.

* * * * *